(12) United States Patent
Deval et al.

(10) Patent No.: US 11,522,805 B2
(45) Date of Patent: Dec. 6, 2022

(54) TECHNOLOGIES FOR PROTOCOL-AGNOSTIC NETWORK PACKET SEGMENTATION

(71) Applicant: Intel Corporation, Santa Clara, CA (US)

(72) Inventors: Manasi Deval, Portland, OR (US); Gregory J. Bowers, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/236,429

(22) Filed: Dec. 29, 2018

(65) Prior Publication Data
US 2019/0140967 A1    May 9, 2019

(51) Int. Cl.
| | |
|---|---|
| *H04L 47/36* | (2022.01) |
| *H04L 45/74* | (2022.01) |
| *H04L 69/22* | (2022.01) |
| *H04L 69/321* | (2022.01) |
| *H04L 69/166* | (2022.01) |
| *H04L 69/324* | (2022.01) |

(52) U.S. Cl.
CPC .............. *H04L 47/36* (2013.01); *H04L 45/74* (2013.01); *H04L 69/166* (2013.01); *H04L 69/22* (2013.01); *H04L 69/321* (2013.01); *H04L 69/324* (2013.01)

(58) Field of Classification Search
CPC ....... H04L 45/74; H04L 47/36; H04L 69/166; H04L 69/22; H04L 69/321
See application file for complete search history.

(56) References Cited

U.S. PATENT DOCUMENTS

| | | | | |
|---|---|---|---|---|
| 11,146,667 | B2* | 10/2021 | Faucette | ............... H04L 69/326 |
| 2003/0048792 | A1* | 3/2003 | Xu | ......................... H04L 49/104 |
| | | | | 370/400 |
| 2013/0156039 | A1* | 6/2013 | Cheng | .................. H04W 28/065 |
| | | | | 370/395.1 |
| 2015/0372717 | A1* | 12/2015 | Schrum, Jr. | ............. H04L 5/003 |
| | | | | 370/458 |
| 2016/0241482 | A1* | 8/2016 | Tsuruoka | ............... H04L 47/621 |
| 2018/0181431 | A1* | 6/2018 | Vincent | ............... H04L 12/4633 |
| 2018/0220322 | A1* | 8/2018 | Atre | ....................... H04W 28/02 |

OTHER PUBLICATIONS

Xu, Herbert, "GSO: Generic Segmentation Offload", LWN.net, Jun. 2006, 2 pages.

* cited by examiner

*Primary Examiner* — Rhonda L Murphy
(74) *Attorney, Agent, or Firm* — Compass IP Law PC

(57) ABSTRACT

Technologies for protocol-agnostic network packet segmentation includes determining whether a size of a payload of a network packet to be transmitted by the compute device exceeds a maximum size threshold and segmenting the payload into a plurality of segmented payloads if the size of the payload exceeds the maximum size of threshold. The payload may be segmented based on segmentation metadata associated with the network packet.

13 Claims, 4 Drawing Sheets

TECHNOLOGIES FOR PROTOCOL-AGNOSTIC NETWORK PACKET SEGMENTATION

BACKGROUND

Modern computing devices have become ubiquitous tools for personal, business, and social uses. As such, many modern computing devices are capable of connecting to various data networks, including the Internet, to transmit and receive data communications over the various data networks at varying rates of speed. To facilitate communications between computing devices, the data networks typically include one or more network computing devices (e.g., compute servers, storage servers, etc.) to route communications (e.g., via switches, routers, etc.) that enter/exit a network (e.g., north-south network traffic) and between network computing devices in the network (e.g., east-west network traffic). In present packet-switched network architectures, data is transmitted in the form of network packets between networked computing devices. At a high level, data is packetized into a network packet at one computing device and the resulting packet transmitted, via a transmission device (e.g., a network interface controller (NIC) of the computing device), to another computing device over a network.

Oftentimes, the data to be packetized is too large to be transmitted in a single network packet, typically limited by a maximum transmission unit/segment size supported by the applicable network. Under such conditions, segmentation is often performed to divide the data into smaller units for transmission over the network, which can be reassembled into the proper order at the receiving computing device. Traditionally, such network traffic has primarily used Transmission Control Protocol/Internet Protocol (TCP/IP) as the communication protocols to interconnect networked computing devices (e.g., over the internet). However, as computing devices have become more mobile and the device usage has evolved to text, pictures, video and audio, the traffic patterns associated therewith are changing seemingly faster than protocols can be changed to support them. Further, the computing device hardware cannot keep up with the changes in protocols and offloads associated with them, in particular as related to packet processing hardware that includes performing packet segmentation operations.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
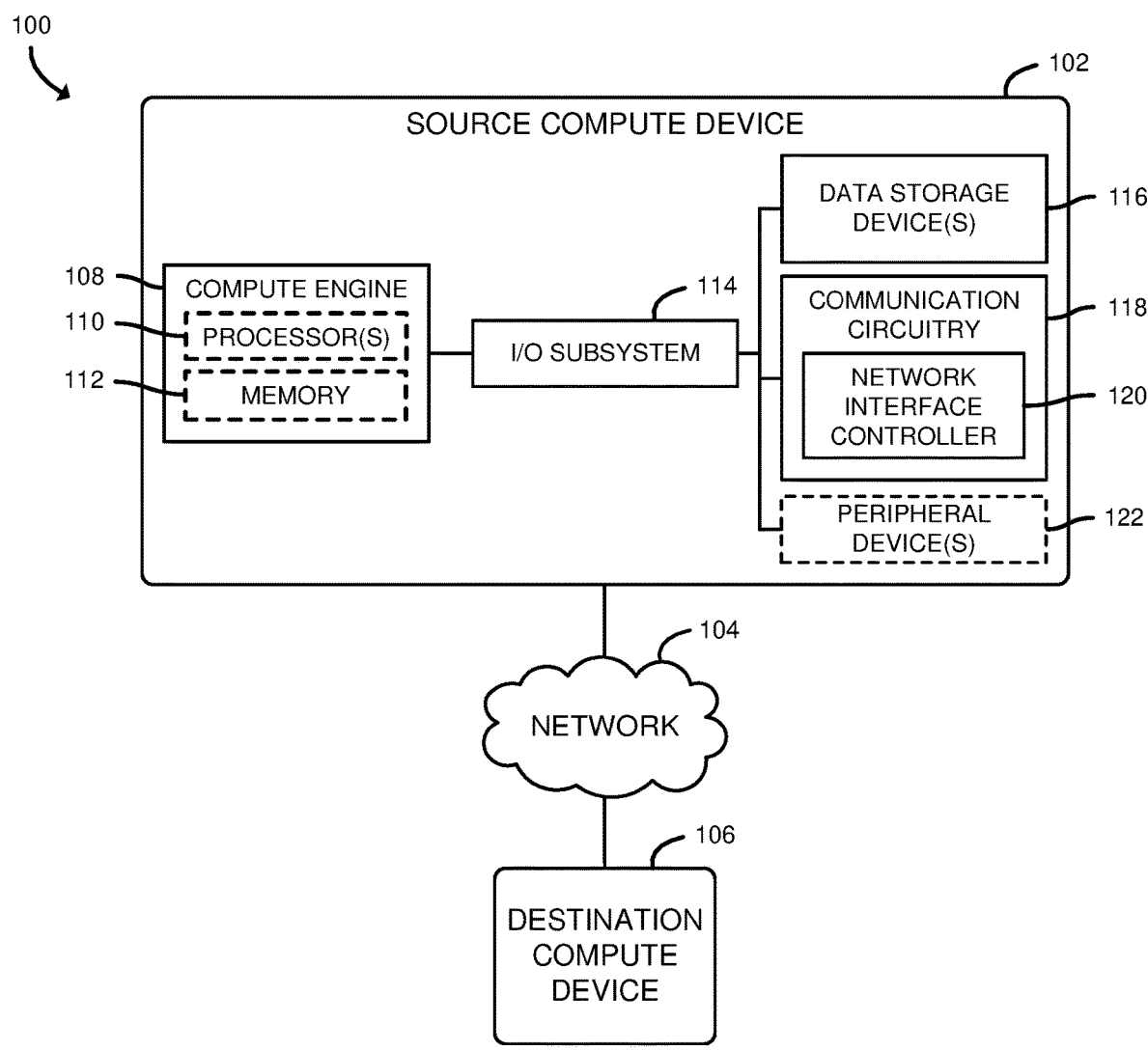
FIG. 1 is a simplified block diagram of at least one embodiment of a system for protocol-agnostic network packet segmentation that includes a source compute device and a destination compute device communicatively coupled via a network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for protocol-agnostic network packet segmentation is shown and includes a source compute device 102 communicatively coupled to a destination compute device 106 via a network 104. While illustratively shown as having a single source compute device 102 and a single destination compute device 106, the system 100 may include multiple source compute devices 102 and multiple destination compute devices 106, in other embodiments. It should be appreciated that the source compute device 102 and destination compute device 106 have been illustratively designated herein as being one of a "source" and a "destination" for the purposes of providing clarity to the description and that the source compute device 102 and/or the destination compute device 106 may be capable of performing any of the functions described herein. It should be further appreciated that the source compute device 102 and the destination compute device 106 may reside in the same data center or high-performance computing (HPC) environment. In other words, the source compute device 102 and destination compute device 106 may reside in the same network 104 connected via one or more wired interconnects.

In use, the source compute device 102 and the destination compute device 106 transmit and receive network traffic (e.g., network packets, frames, etc.) to/from each other. For example, the destination compute device 106 may receive a network packet from the source compute device 102. Depending on the size of the data to be transmitted from the source compute device 102 to the destination compute device 106, the source compute device 102 may be configured to segment the data, at the segmentation layer, into multiple data segments to be transmitted as separate payloads of multiple network packets. For example, the source compute device 102 may be configured to compare a size of the data to be transmitted against a maximum data size threshold (e.g., a maximum transmission unit (MTU), a maximum segment size (MSS), etc.). Accordingly, the source compute device 102 may compare the data to the maximum data size threshold, segment a portion of the data into a segmented data portion based on the maximum data size threshold.

As will be described in further detail below, the source compute device 102 is configured to perform a generic transmit segmentation offload to segment large network packets for various network protocols. To do so, the source compute device 102 is configured to receive (e.g., from software) a description of all of the segmentation details to lower layers of the protocol stack, possibly including hardware, using a descriptive language described herein. Accordingly, based on the segmentation details, the source compute device 102 can identify priority rules, framing rules and determine if each is segmentable using the protocol-agnostic segmentation protocol.

It should be understood that the segmentation layer is the layer that supports the generic transmit segmentation offload. In other words, the segmentation layer is configured to receive large network packets to be transmitted and either segments the large network packet itself or programs a lower layer to segment them. It should be appreciated that the segmentation layer has certain capabilities (i.e., segmentation layer capabilities) that will be described herein, that a sending layer can use to ensure that transmitted network packets conform to the segmentation layer capabilities. To do so, the segmentation layer may rely on a preconfigured segmentation profile, which defines the segmentation for a combination of protocols via a list of generic transmit segmentation offload profile elements. Additionally, the segmentation layer is configured to receive segmentation metadata, which includes segmentation instructions passed with a large data packet to be transmitted. The segmentation metadata may include information required to safely segment a packet and/or information that may be associated with the segmentation profiles.

The source compute device 102 may be embodied as any type of computation or computer device capable of performing the functions described herein, including, without limitation, a computer, a server (e.g., stand-alone, rack-mounted, blade, etc.), a sled (e.g., a compute sled, an accelerator sled, a storage sled, a memory sled, etc.), an enhanced or smart NIC (e.g., a host fabric interface (HFI)), a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system.

As shown in FIG. 1, the illustrative source compute device 102 includes a compute engine 108, an I/O subsystem 114, one or more data storage devices 116, communication circuitry 118, and, in some embodiments, one or more peripheral devices 122. It should be appreciated that the source compute device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 108 may be embodied as any type of device or collection of devices capable of performing the various compute functions as described herein. In some embodiments, the compute engine 108 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 108 may include, or may be embodied as, one or more processors 110 (i.e., one or more central processing units (CPUs)) and memory 112.

The processor(s) 110 may be embodied as any type of processor(s) capable of performing the functions described herein. For example, the processor(s) 110 may be embodied as one or more single-core processors, multi-core processors, digital signal processors (DSPs), microcontrollers, or other processor(s) or processing/controlling circuit(s). In some embodiments, the processor(s) 110 may be embodied as, include, or otherwise be coupled to an FPGA, an ASIC, reconfigurable hardware or hardware circuitry, or other specialized hardware to facilitate performance of the functions described herein.

The memory 112 may be embodied as any type of volatile or non-volatile memory or data storage capable of performing the functions described herein. It should be appreciated that the memory 112 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 108 is communicatively coupled to other components of the source compute device 102 via the I/O subsystem 114, which may be embodied as circuitry and/or components to facilitate input/output operations with the processor 110, the memory 112, and other components of the source compute device 102. For example, the I/O subsystem 114 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 114 may form a portion of a SoC and be incorporated, along with one or more of the processor 110, the memory 112, and other components of the source compute device 102, on a single integrated circuit chip.

The one or more data storage devices 116 may be embodied as any type of storage device(s) configured for short-term or long-term storage of data, such as, for example, memory devices and circuits, memory cards, hard disk drives, solid-state drives, or other data storage devices. Each data storage device 116 may include a system partition that stores data and firmware code for the data storage device 116. Each data storage device 116 may also include an operating system partition that stores data files and executables for an operating system.

The communication circuitry 118 may be embodied as any communication circuit, device, or collection thereof, capable of enabling communications between the source compute device 102 and other computing devices, such as the source compute device 102, as well as any network communication enabling devices, such as an access point, network switch/router, etc., to allow communication over the network 104. Accordingly, the communication circuitry 118 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 118 may include specialized circuitry, hardware, or combination thereof to perform pipeline logic (e.g., hardware algorithms) for performing the functions described herein, including comparing the network packet data/characteristic with the classification filters, processing network packets (e.g., parse received network packets, determine destination computing devices for each received network packets, forward the network packets to a particular buffer queue of a respective host buffer of the source compute device 102, etc.), performing computational functions, etc.

In some embodiments, performance of one or more of the functions of communication circuitry 118 as described herein may be performed by specialized circuitry, hardware, or combination thereof of the communication circuitry 118, which may be embodied as a SoC or otherwise form a portion of a SoC of the source compute device 102 (e.g., incorporated on a single integrated circuit chip along with a processor 110, the memory 112, and/or other components of the source compute device 102). Alternatively, in some embodiments, the specialized circuitry, hardware, or combination thereof may be embodied as one or more discrete processing units of the source compute device 102, each of which may be capable of performing one or more of the functions described herein.

The illustrative communication circuitry 118 includes the NIC 120, which may also be referred to as a host fabric interface (HFI) in some embodiments (e.g., high performance computing (HPC) environments). The NIC 120 may be embodied as one or more add-in-boards, daughtercards, network interface cards, controller chips, chipsets, or other devices that may be used by the source compute device 102 to connect with another compute device (e.g., the destination compute device 106). In some embodiments, the NIC 120 may be embodied as part of a SoC that includes one or more processors, or included on a multichip package that also contains one or more processors.

While not illustratively shown, it should be understood that the NIC 120 includes one or more physical ports for facilitating the ingress and egress of network traffic to/from the NIC 120. Additionally, in some embodiments, the NIC 120 may include one or more offloads/accelerators, such as a direct memory access (DMA) engine. In some embodiments, the NIC 120 may include a local processor (not shown) and/or a local memory (not shown) that are both local to the NIC 120. In such embodiments, the local processor of the NIC 120 may be capable of performing one or more of the functions of a processor 110 described herein. Additionally or alternatively, in such embodiments, the local memory of the NIC 120 may be integrated into one or more components of the source compute device 102 at the board level, socket level, chip level, and/or other levels.

The one or more peripheral devices 122 may include any type of device that is usable to input information into the source compute device 102 and/or receive information from the source compute device 102. The peripheral devices 122 may be embodied as any auxiliary device usable to input information into the source compute device 102, such as a keyboard, a mouse, a microphone, a barcode reader, an image scanner, etc., or output information from the source compute device 102, such as a display, a speaker, graphics circuitry, a printer, a projector, etc. It should be appreciated that, in some embodiments, one or more of the peripheral devices 122 may function as both an input device and an output device (e.g., a touchscreen display, a digitizer on top of a display screen, etc.). It should be further appreciated that the types of peripheral devices 122 connected to the source compute device 102 may depend on, for example, the type and/or intended use of the source compute device 102. Additionally or alternatively, in some embodiments, the peripheral devices 122 may include one or more ports, such as a USB port, for example, for connecting external peripheral devices to the source compute device 102.

The destination compute device 106 may be embodied as any type of computation or computer device capable of performing the functions described herein, including, without limitation, a smartphone, a mobile computing device, a tablet computer, a laptop computer, a notebook computer, a computer, a server (e.g., stand-alone, rack-mounted, blade, etc.), a sled (e.g., a compute sled, an accelerator sled, a storage sled, a memory sled, etc.), a network appliance (e.g., physical or virtual), a web appliance, a distributed computing system, a processor-based system, and/or a multiprocessor system. While not illustratively shown, it should be appreciated that destination compute device 106 includes similar and/or like components to those of the illustrative source compute device 102. As such, figures and descriptions of the like components are not repeated herein for clarity of the description with the understanding that the description of the corresponding components provided above in regard to the source compute device 102 applies equally to the corresponding components of the destination compute device 106. Of course, it should be appreciated that the computing devices may include additional and/or alternative components, depending on the embodiment.

The network 104 may be embodied as any type of wired or wireless communication network, including but not limited to a wireless local area network (WLAN), a wireless personal area network (WPAN), an edge network (e.g., a multi-access edge computing (MEC) network), a fog network, a cellular network (e.g., Global System for Mobile Communications (GSM), Long-Term Evolution (LTE), 5G, etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communication between the source compute device 102 and the destination compute device 106, which are not shown to preserve clarity of the description.

Figure 2:
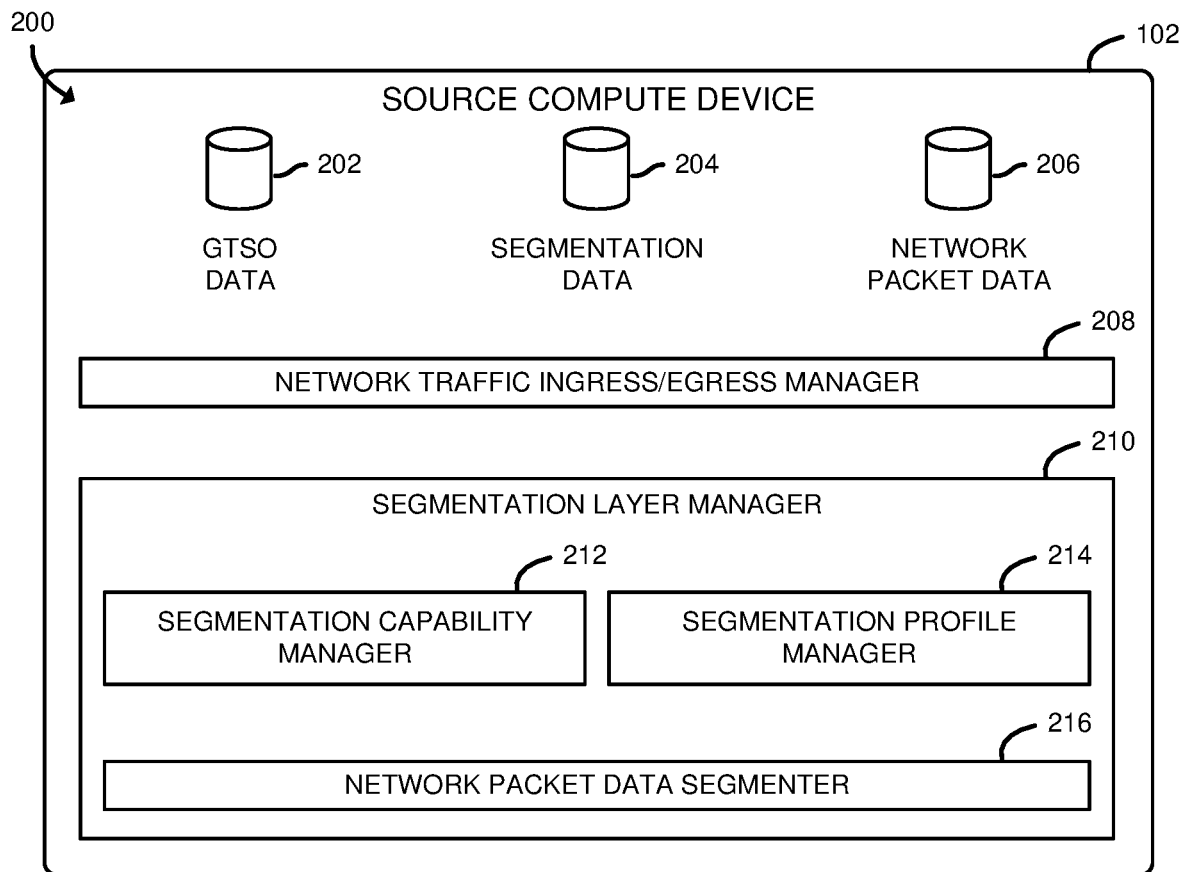
FIG. 2 is a simplified block diagram of at least one embodiment of an environment of the source compute device of the system of FIG. 1.

Referring now to FIG. 2, in use, the source compute device 102 establishes an environment 200 during operation. The illustrative environment 200 includes a network traffic ingress/egress manager 208 and a segmentation layer manager 210. The various components of the environment 200 may be embodied as hardware, firmware, software, or a combination thereof. As such, in some embodiments, one or more of the components of the environment 200 may be embodied as circuitry or collection of electrical devices (e.g., network traffic ingress/egress management circuitry 208, segmentation layer management circuitry 210, etc.).

In some embodiments, at least a portion of the functions described herein may be performed by the network traffic ingress/egress management circuitry 208 and the segmentation layer management circuitry 210 as a portion of the NIC 120. However, it should be appreciated that, in other embodiments, one or more functions described herein as being performed by the network traffic ingress/egress management circuitry 208 and/or the segmentation layer management circuitry 210 may be performed, at least in part, by one or more other components of the source compute device 102, such as the compute engine 108, the I/O subsystem 114, other portions of the communication circuitry 118, and/or other components of the source compute device 102.

Additionally, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by the NIC 120, the compute engine 108, or other components of the source compute device 102. It should be appreciated that the source compute device 102 may include other components, sub-components, modules, sub-modules, logic, sub-logic, and/or devices commonly found in a computing device, which are not illustrated in FIG. 2 for clarity of the description.

In the illustrative environment 200, the source compute device 102 additionally includes generic transmit segmentation offload (GTSO) data 202, segmentation data 204, and network packet data 206, each of which may be accessed by the various components and/or sub-components of the source compute device 102. Further, each of the GTSO data 202, the segmentation data 204, and the network packet data 206 may be accessed by the various components of the source compute device 102. Additionally, it should be appreciated that in some embodiments the data stored in, or otherwise represented by, each of the GTSO data 202, the segmentation data 204, and the network packet data 206 may not be mutually exclusive relative to each other. For example, in some implementations, data stored in the GTSO data 202 may also be stored as a portion of one or more of the segmentation data 204 and/or the network packet data 206, or in another alternative arrangement. As such, although the various data utilized by the source compute device 102 is described herein as particular discrete data, such data may be combined, aggregated, and/or otherwise form portions of a single or multiple data sets, including duplicative copies, in other embodiments.

The network traffic ingress/egress manager 208, which may be embodied as hardware, firmware, software, virtualized hardware, emulated architecture, and/or a combination thereof as discussed above, is configured to receive inbound and route/transmit outbound network traffic. To do so, the illustrative network traffic ingress/egress manager 208 is configured to facilitate inbound network communications (e.g., network traffic, network packets, network flows, etc.) to the source compute device 102. Accordingly, the network traffic ingress/egress manager 208 is configured to manage (e.g., create, modify, delete, etc.) connections to physical and virtual network ports (i.e., virtual network interfaces) of the source compute device 102 (e.g., via the communication circuitry 118), as well as the ingress buffers/queues associated therewith.

Additionally, the network traffic ingress/egress manager 208 is configured to facilitate outbound network communications (e.g., network traffic, network packet streams, network flows, etc.) from the source compute device 102. To do so, the network traffic ingress/egress manager 208 is configured to manage (e.g., create, modify, delete, etc.) connections to physical and virtual network ports/interfaces of the source compute device 102 (e.g., via the communication circuitry 118), as well as the egress buffers/queues associated therewith. In some embodiments, at least a portion of the network packet (e.g., at least a portion of a header of the network packet, at least a portion of a payload of the network packet, a checksum, etc.) may be stored in the network packet data 206.

The segmentation layer manager 210, which may be embodied as hardware, firmware, software, virtualized hardware, emulated architecture, and/or a combination thereof as discussed above, is configured to manage operations performed at the segmentation layer of the source compute device 102. As described previously, the segmentation layer is the layer that supports the generic transmit segmentation offload. Accordingly, the segmentation layer manager 210 is configured to receive large network packets to be transmitted and either perform the segmentation operations on the large network packets or program a lower layer (e.g., at the NIC 120) to segment the large network packets.

To do so, the illustrative segmentation layer manager 210 includes a segmentation capability manager 212, a segmentation profile manager 214, and a network packet segmenter 216. The segmentation capability manager 212 is configured to manage segmentation layer capabilities of the segmentation layer manager 210. It should be appreciated that hardware components of the source compute device 102 may impose limitations upon software executing on the source compute device 102 relative to the usage of the GTSO language as described herein. For example, a software driver may report greater capabilities up the protocol stack if the software driver is able to handle segmentation work that the hardware cannot, such as handling all segmentation for hardware that does not support segmentation, or translating from GTSO for hardware that supports fixed schemes for certain protocols, such as TCP segmentation.

In an illustrative example, the segmentation capability manager 212 may be configured to manage one or more segmentation layer capabilities, including, but not limited to, a maximum number of headers (e.g., as a range of 1 to "N" headers, including tunnels, wherein "N" is an integer), a maximum tunnel depth (e.g., as a range of 0 to "N" depth, wherein a depth of 0 indicates there are not tunnels and "N" is an integer), a maximum header layer (e.g., as a range of 0 to "N", wherein "N" is an integer and certain protocols may impose a higher initial range value), one or more GTSO segment descriptors (e.g., as a range of 1 to "N" descriptors, wherein "N" is an integer) used to describe the GTSO segments (e.g., descriptors describing a segment, including header descriptors), one or more header descriptors (e.g., as a range of 1 to "N" descriptors, wherein "N" is an integer) that may be used to describe the GTSO headers (e.g., L2, L3, etc.), maximum header size (e.g., in bytes), a flag indicating whether the final header descriptor may contain payload data (e.g., 0 for no data, 1 for data allowed), a list of supported encryption algorithms, a minimum large GTSO size (e.g., headers plus payload size in bytes), a maximum large GTSO size (e.g., headers plus payload size in bytes), a minimum payload segment size (e.g., in bytes), a maximum payload segment size (e.g., in bytes), a maximum number of segments (e.g., e.g., as a range of 1 to "N", wherein "N" is an integer), and a list of any optional extensions to the GTSO that are supported by the segmentation layer.

As described previously the GTSO provides instruction for segmenting large data packets that are to be transmitted using various network protocols, wherein software describes the segmentation details to the lower layers, possibly including hardware, using a descriptive language (i.e., the GTSO language). Accordingly, the segmentation profile manager 214 is configured to manage the GTSO profile elements of the GTSO language, which may include a header layer element, a replication header element, a checksum element, a length element, an incrementing counter element, a flags element, a payload element, an encryption element, etc. The header layer element may be represented as a value of 1 to "N", wherein "N" is an integer value and indicates the maximum header layer value from the segmentation layer capabilities. The replication header element may include address and length values.

The checksum element may include a type specifying usage for calculation and padding purposes, an offset value, a size value, a number of content elements, the content elements, etc. The checksum contents may include a type field, a range field, a constant field, and a count field. The type field may include a type indicator (e.g., a header, a payload, a range, a constant, a size, etc.) that is usable to determine which of the fields the element contains). The range field may include a start location value of a header number or payload, a start offset value (e.g., in bytes), and a length value (e.g., in bytes). The constant field may include a size (e.g., in bytes) and a value (e.g., an integer). The count field may include a start location that specifies a header number or payload to begin counting in bytes, an end location that specifies a header number or payload to stop counting bytes at the specified end location, and a size that specifies the number of bytes to use to return the integer result of the count.

The length element may include a length type (e.g., that indicates whether the length refers to a header length, a payload length, or a combination thereof), an offset value, a size value, and an encoding type. The incrementing counter element may include a type (e.g., a payload count, a packet count, a fixed increment, etc.), an offset value, a size value, a mask (e.g. for range limiting), an encoding indicator (e.g., an integer, a variable length integer, an indicator of low order bytes), and a fixed increment indicator (e.g., an integer with a value to add to each segmented network packet). In an illustrative example, the encoding indicator may include an integer field (e.g., 1-8 bytes), a variable length integer type one field (e.g., wherein the first two bits determine a number of bytes), a variable length integer type two field (e.g., wherein the first one or two bits determine a number of bytes), and a low order bytes field (e.g., wherein low order bytes are specified in the field and the high order bytes are inferred by the recipient).

The flags element may include an offset value, a size value, a first flags indicator (e.g., flag values for the first segmented network packet), a last flags indicator (e.g., flag values for the last segmented network packet), a middle flags indicator (e.g., flag values for the segmented network packets between the first segmented network packet and the last segmented network packet). The payload element may include a total payload length, a payload segment size, a number of safe segmentation offsets, and the safe segmentation offsets. The safe segmentation offsets may be embodied as an optional list of payload offsets representing safe locations to segment the payload, which allows for segmentation of payloads containing higher level protocols that are not being specified down to the current segmentation layer. It should be appreciated that the range between offsets should be less than or equal to the payload segment size. In some embodiments, the payload element may be optional and used for GTSO profiles wherein the large network packet will normally look identical in terms of the payload element values.

The encryption element may include a number of encryption elements and the encryption elements. The encryption element may include an algorithm indicator field, an encryption range field, a nonce value field, and a Message Authentication Code (MAC) field. The algorithm indicator field may contain any type of data usable to identify the type of algorithm used for the encryption to determine how other fields in the encryption element may be used. The encryption range field may include a start offset value (e.g., in bytes, relative to a beginning of the header) and a length value (e.g., in bytes, wherein a value of "0" indicates to the end of the payload). It should be understood that, if the size of the header increases during segmentation, then the offset value (s) should be adjusted accordingly. The nonce field may include a start offset value (e.g., in bytes, relative to the beginning of the header) and a length value (e.g., in bytes). The MAC field may include any type of data usable to indicate where to store the MAC (e.g., not at all, before the encrypted block, after the encrypted block, etc.). In some embodiments, the encryption element may be optional and used for GTSO profiles wherein the large network packet will normally look identical in terms of the payload element values, and the payload is to appear either here or in the per-packet metadata. The segmentation layer capabilities may be stored in the GTSO data 202, in some embodiments. Additionally or alternatively, the GTSO profile elements may be stored in the segmentation data 204, in some embodiments.

The network packet data segmenter 216 is configured to perform the segmentation operations on the data to be segmented, based on a segmentation profile. To do so, the network packet data segmenter 216 is configured to receive GTSO segmentation metadata (e.g., from the protocol stack) with each large network packet that is to be segmented. Depending on the embodiment, the GTSO segmentation metadata may include a reference usable to identify the segmentation profile to be used to segment the large network packet, an entire segmentation profile, or some amount of data therebetween. Accordingly, the GTSO segmentation metadata may include one or more elements, such as, but not limited to, a segmentation profile indicator element (e.g., a numeric reference mapped to the segmentation profile), a payload element, and an encryption element.

The payload element may include a total payload length, a payload segment size, a number of safe segmentation offsets, and the safe segmentation offsets themselves. The safe segmentation offsets are embodied as an optional list of payload offsets representing safe locations to segment the payload. It should be appreciated that doing so allows for the segmentation of payloads containing higher level protocols that are not being specified down to the current segmentation layer. It should be further appreciated that the range between offsets should be less than or equal to the payload segment size. The encryption element may include a number of encryption elements and the encryption elements themselves, as described previously.

Figure 3:
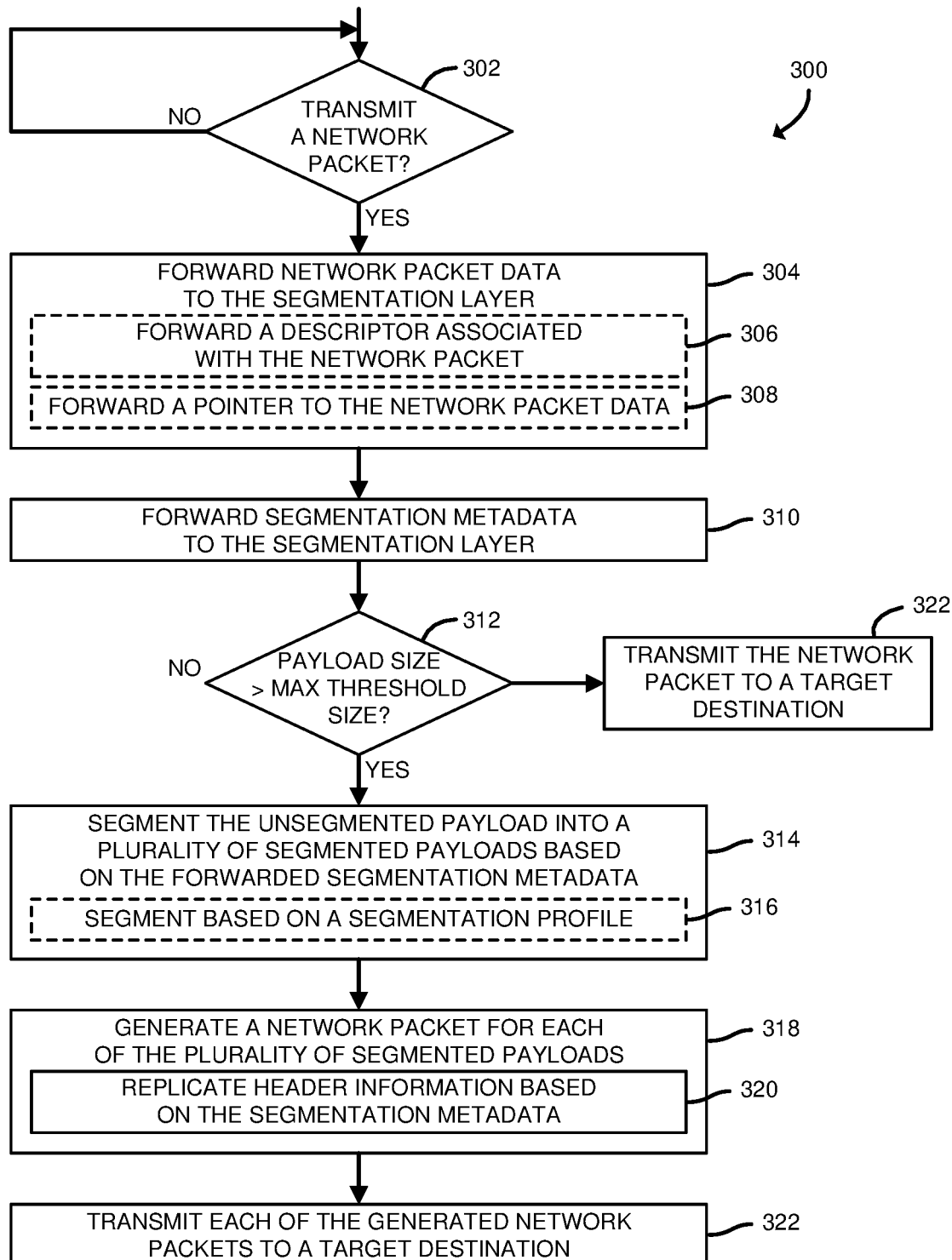
FIG. 3 is a simplified flow diagram of at least one embodiment of a method for protocol-agnostic network packet segmentation that may be executed by the source compute device of FIGS. 1 and 2.

Referring now to FIG. 3, a method 300 for protocol-agnostic network packet segmentation is shown which may be executed by a compute device (e.g., the source compute device 102 of FIGS. 1 and 2), or more particularly by a NIC and/or segmentation layer of the compute device (e.g., the NIC 120 of FIG. 1 and the segmentation layer manager 210 of FIG. 2). The method 300 begins with block 302, in which the source compute device 102 determines whether a network packet is to be transmitted. If so, the method 300 advances to block 304, in which the source compute device 102 forwards the data associated with the network packet to the segmentation layer. To do so, in some embodiments, in block 306, the source compute device 102 may forward a descriptor associated with the network packet that includes a pointer to the network packet data. Alternatively, in other embodiments, in block 308, the source compute device 102 may forward a pointer to the network packet data.

In block 310, the source compute device 102 forwards segmentation metadata corresponding to the network packet data to the segmentation layer. In block 312, the source compute device 102 determines whether a size of the payload (i.e., the data of the network packet to be transmitted) is greater than a maximum threshold size (e.g., MTU, MSS, etc.). If not, the method 300 branches to block 322, in which the source compute device 102 transmits the network packet to a target destination (e.g., the destination compute device 106); otherwise, if the source compute device 102 determines that the size of the payload is greater than the maximum threshold size, the method 300 branches to block 314.

In block 314, the source compute device 102, or more particularly the segmentation layer, segments the unsegmented payload into a plurality of segmented payloads based on the segmentation metadata. Depending on the embodiment, as described previously, in block 316, the source compute device 102 may segment the unsegmented payload based on a segmentation profile referenced by the segmentation metadata. In block 318, the source compute device 102 generates a network packet (e.g., encapsulates a segmented portion of the payload with an applicable header) for each of the plurality of segmented payloads. In block 320, the source compute device 102 replicates header information based on the segmentation data, which is described in further detail below. In block 322, the source compute device 102 transmits each of the generated network packets to a target destination (e.g., the destination compute device 106).

Figure 4:
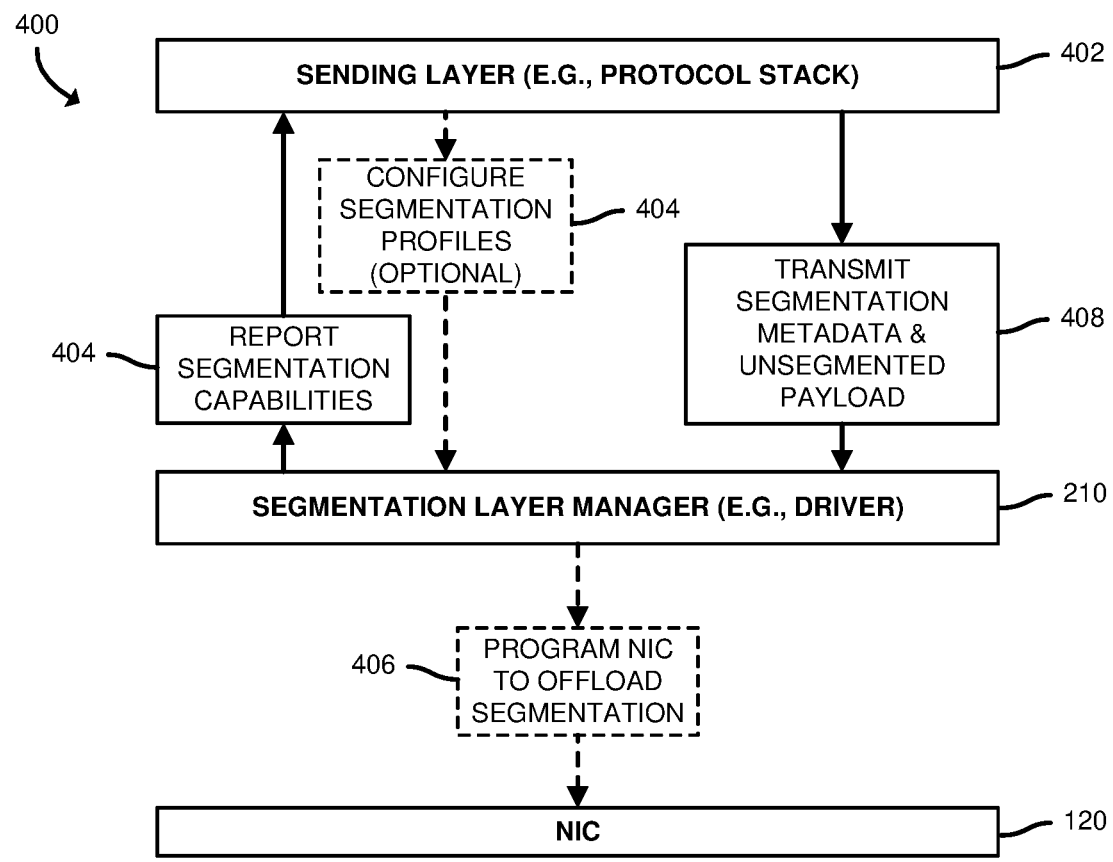
FIG. 4 is a simplified block diagram of at least one embodiment of a data flow for protocol-agnostic network packet segmentation by the destination compute device of the system of FIGS. 1 and 2.

Referring now to FIG. 4, in illustrative data flow 400 for protocol-agnostic network packet segmentation is shown that includes a sending layer 402 (e.g., the protocol stack), the segmentation layer manager 210 of FIG. 2, and the NIC 120 of FIG. 1. As illustratively shown, in data flow block 404, the segmentation layer manager 210 reports segmentation capabilities to the sending layer 402. Optionally, in data flow block 404, the sending layer 402 may configure one or more segmentation profiles for use by the segmentation layer manager 210 to instruct the segmentation layer manager 210 how to perform the network packet segmentation operations.

As described previously, in some embodiments, a segmentation profile may not be used, as the data captured by the segmentation profile may be transmitted with the segmentation metadata. In some embodiments, in data flow block 406, the segmentation layer manager 210 may program the NIC 120 to perform the segmentation operations. In other words, the segmentation layer manager 210 may offload the segmentation operations off to the NIC 120. It should be appreciated that the segmentation layer could be either hardware (e.g., silicon, an FPGA, etc.), or a lower layer of software. It should be further appreciated that, before segmentation can start, the segmentation layer must communicate its segmentation capabilities to the layer above. Accordingly, segmentation profiles may be supplied which describe the rules for a particular type of segmentation, where rules are any static information, such as elements with fixed type, size, offset, encoding, etc.

It should be understood that headers should be specified as an in order list, in the order that they would appear on the wire. Further, each header should be specified separately so that the segmentation layer can adjust the size of a header, as necessary. Accordingly, it should be appreciated that GTSO supports tunnels and header replication to layers limited only by segmentation layer capabilities. As described previously, the segmentation layer may support one or more techniques for receiving segmentation instruction. In the case of hardware, for example, segmentation metadata may be passed in descriptors, as a descriptor pointing to metadata, or a combination thereof. Furthermore, any segmentation that cannot be performed by the segmentation layer should be handled by the layer above. As described previously, in data flow block 408, when data is to be transmitted, the sending layer 402 transmits segmentation metadata and the data (e.g., the unsegmented payload) to the segmentation layer manager 210, at which point the segmentation layer manager 210, or the NIC 120, depending on the embodiment, will perform the segmentation operations consistent with the segmentation capabilities provided in the segmentation metadata.

In an illustrative example, a TCP segmentation offload is replaced with the GTSO as described herein with MAC, IPv4, and TCP headers. To do so, a description of replicated headers is passed to the segmentation layer (e.g., via a segmentation profile and/or the segmentation metadata) that includes a replicated first header (e.g., L2) that does not include any elements, a replicated second header (e.g., L3) and a replicated third header (e.g., L4). The replicated second header includes a checksum element (e.g., IPv4 header checksum), a length element (e.g., IPv4 total length), and, optionally if IP fragmentation is enabled, an incrementing counter element for packet count. The replicated third header includes an incrementing counter element for payload count (e.g., a TCP sequence number), a flags element (e.g., TCP flags), and a checksum element (e.g., TCP checksum) that includes relevant type and content information (e.g., range start locations, offset values, length values, constant sizes/values, etc., as well as the header and payload).

For the illustrative embodiment, the upper layer will create the L2 header (e.g., created as-is), the IPv4 header with zeroed checksum and length fields, and the TCP header with checksum calculated over the IPv4 pseudo-header without the TCP length field. Additionally, for the illustrative example, the lower level will replicate the L2 header as-is, replicate the L3 header while updating the applicable checksum, length, and incrementing counter, and replicate the L4 header while updating the applicable incrementing counter, flags, and checksum.

In another illustrative embodiment, the GTSO as described herein is illustratively used for Real-time Transport Protocol (RTP) segmentation with GTSO for MAC, IPv4, UDP, and RTP headers. To do so, a description of the replicated headers is passed to the segmentation layer that includes a first header (L2) that does not include any elements, a second header (L3), a third header (L4), and a fourth header (L5). The second header includes a checksum element (e.g., IPv4 header checksum), a length element (e.g., IPv4 total length), and, optionally, an incrementing counter element for packet count (e.g., IPv4 identification). The third header includes a length field for the header and payload (e.g., UDP) length, and a checksum element (e.g., UDP checksum) that includes relevant type and content information (e.g., range start locations, offset values, length values, constant sizes/values, etc., as well as the header and payload). The fourth header includes an incrementing counter element for packet count (e.g., RTP sequence number) and an incrementing counter element for fixed increment (e.g., RTP timestamp).

For the illustrative embodiment, the upper layer will create the replicated L2 header as-is, the IPv4 header with zeroed checksum and length fields, the UDP header with length zeroed and checksum calculated over the IPv4 pseudo-header (e.g., implicitly without the UDP Length field since it is zeroed), and the RTP header as-is. Additionally, for the illustrative embodiment, the lower layer will replicate the L2 header as-is, replicate the L3 header while updating the checksum, length, and incrementing counter, replicate the L4 header while updating the length and checksum, and replicate the L5 header while updating the both incrementing counters.

In yet another illustrative example, the GTSO as described herein is illustratively used for Quick UDP Internet Connections (QUIC) segmentation with GTSO for MAC, IPv4, UDP, and QUIC headers. To do so, a description of the replicated headers is passed to the segmentation layer that includes a first header (L2) that does not include any elements, a second header (L3), a third header (L4), and a fourth header (L5). The second header includes a checksum element (e.g., IPv4 header checksum), a length element (e.g., IPv4 total length), and, optionally, an incrementing counter element for packet count (e.g., IPv4 identification). The third header includes a length field for the header and payload (e.g., UDP) length, and a checksum element (e.g., UDP checksum) that includes relevant type and content information (e.g., range start locations, offset values, length values, constant sizes/values, etc., as well as the header and payload). The fourth header includes an incrementing counter element for packet count (e.g., QUIC packet number), safe segmentation offsets (e.g., QUIC frame boundaries), a payload encryption element (e.g., QUIC payload), and a packet number encryption element (e.g., QUIC packet number).

For the illustrative embodiment, the upper layer will create the replicated L2 header as-is, the IPv4 header with zeroed checksum and length fields, the UDP header with length zeroed and checksum calculated over the IPv4 pseudo-header (e.g., implicitly without the UDP Length field since it is zeroed), and the QUIC header as-is. Additionally, for the illustrative embodiment, the lower layer will replicate the L2 header as-is, replicate the L3 header while updating the checksum, length, and incrementing counter, replicate the L4 header while updating the length and checksum, and replicate the L5 header while updating the incrementing counter and performing two encryption steps. Furthermore, it should be appreciated that segments will be created at safe segmentation offsets, such that the largest payload segment size possible is used for each network packet.

EXAMPLES

Illustrative examples of the technologies disclosed herein are provided below. An embodiment of the technologies may include any one or more, and any combination of, the examples described below.

Example 1 includes a compute device for protocol-agnostic network packet segmentation, the compute device comprising circuitry to determine whether a size of a payload of a network packet to be transmitted by the compute device exceeds a maximum size threshold; and segment, by a segmentation layer of the compute device and in response to a determination that the size of the payload of the network packet exceeds the maximum size threshold, the payload into a plurality of segmented payloads based on segmentation metadata associated with the network packet.

Example 2 includes the subject matter of Example 1, and wherein the circuitry is further to receive, by the segmentation layer, the segmentation metadata from a protocol stack of the compute device.

Example 3 includes the subject matter of any of Examples 1 and 2, and wherein the circuitry is further to replicate header information for each of the plurality of segmented payloads; and generate a plurality of network packets, wherein each of the plurality of network packets includes replicated header information and a segmented payload of the plurality of segmented payloads.

Example 4 includes the subject matter of any of Examples 1-3, and wherein the segmentation layer comprises a driver of a network interface controller (NIC).

Example 5 includes the subject matter of any of Examples 1-4, and wherein the segmentation layer is to program the a network interface controller (NIC) to offload segmentation to the NIC, and wherein the NIC is to perform the offloaded segmentation of the payload into the plurality of segmented payloads.

Example 6 includes the subject matter of any of Examples 1-5, and wherein the segmentation layer is to report segmentation capabilities to a sending layer of the compute device, and wherein the sending layer is to configure a segmentation profile based on the reported segmentation capabilities.

Example 7 includes the subject matter of any of Examples 1-6, and wherein the sending layer is to transmit the segmentation metadata to the segmentation layer, and wherein the segmentation metadata includes a pointer to the configured segmentation profile.

Example 8 includes the subject matter of any of Examples 1-7, and wherein the segmentation layer is to segment the payload into the plurality of segmented payloads based on the configured segmentation profile.

Example 9 includes a method for protocol-agnostic network packet segmentation, the method comprising determining, by a compute device, whether a size of a payload of a network packet to be transmitted by the compute device exceeds a maximum size threshold; and segmenting, by a segmentation layer of the compute device and in response to a determination that the size of the payload of the network packet exceeds the maximum size threshold, the payload into a plurality of segmented payloads based on segmentation metadata associated with the network packet.

Example 10 includes the subject matter of Example 9, and further including receiving, by the segmentation layer, the segmentation metadata from a protocol stack of the compute device.

Example 11 includes the subject matter of any of Examples 9 and 10, and further including replicating, by the compute device, header information for each of the plurality of segmented payloads; and generating, by the compute device, a plurality of network packets, wherein each of the plurality of network packets includes replicated header information and a segmented payload of the plurality of segmented payloads.

Example 12 includes the subject matter of any of Examples 9-11, and wherein the segmentation layer comprises a driver of a network interface controller (NIC).

Example 13 includes the subject matter of any of Examples 9-12, and further including programming, by the segmentation layer, a network interface controller (NIC) to offload segmentation to the NIC, and wherein the NIC is to perform the offloaded segmentation of the payload into the plurality of segmented payloads.

Example 14 includes the subject matter of any of Examples 9-13, and further including reporting, by the segmentation layer, segmentation capabilities to a sending layer of the compute device, and configuring, by the sending layer, a segmentation profile based on the reported segmentation capabilities.

Example 15 includes the subject matter of any of Examples 9-14, and further including transmitting, by the sending layer, the segmentation metadata to the segmentation layer, and wherein the segmentation metadata includes a pointer to the configured segmentation profile.

Example 16 includes the subject matter of any of Examples 9-15, and further including segmenting, by the segmentation layer, the payload into the plurality of segmented payloads based on the configured segmentation profile.

Example 17 includes one or more machine-readable storage media comprising a plurality of instructions stored thereon that, when executed, cause a compute device to determine whether a size of a payload of a network packet to be transmitted by the compute device exceeds a maximum size threshold; and segment, by a segmentation layer of the compute device and in response to a determination that the size of the payload of the network packet exceeds the maximum size threshold, the payload into a plurality of segmented payloads based on segmentation metadata associated with the network packet.

Example 18 includes the subject matter of Example 17, and wherein the plurality of instructions, when executed, further cause the compute device to receive, by the segmentation layer, the segmentation metadata from a protocol stack of the compute device.

Example 19 includes the subject matter of any of Examples 17 and 18, and wherein the plurality of instructions, when executed, further cause the compute device to replicate header information for each of the plurality of segmented payloads; and generate a plurality of network packets, wherein each of the plurality of network packets includes replicated header information and a segmented payload of the plurality of segmented payloads.

Example 20 includes the subject matter of any of Examples 17-19, and wherein the segmentation layer comprises a driver of a network interface controller (NIC).

Example 21 includes the subject matter of any of Examples 17-20, and wherein the segmentation layer is to program the a network interface controller (NIC) to offload segmentation to the NIC, and wherein the NIC is to perform the offloaded segmentation of the payload into the plurality of segmented payloads.

Example 22 includes the subject matter of any of Examples 17-21, and wherein the segmentation layer is to report segmentation capabilities to a sending layer of the compute device, and wherein the sending layer is to configure a segmentation profile based on the reported segmentation capabilities.

Example 23 includes the subject matter of any of Examples 17-22, and wherein the sending layer is to transmit the segmentation metadata to the segmentation layer, and wherein the segmentation metadata includes a pointer to the configured segmentation profile.

Example 24 includes the subject matter of any of Examples 17-23, and wherein the segmentation layer is to segment the payload into the plurality of segmented payloads based on the configured segmentation profile.

The invention claimed is:

1. A network interface controller (NIC) for protocol-agnostic network packet segmentation, the NIC comprising:
   circuitry to:
      send segmentation capabilities of the NIC to a protocol stack of a compute device;
      receive, from the protocol stack, a segmentation profile for a network packet based on the sent segmentation capabilities;
      determine whether a size of a payload of the network packet exceeds a maximum size threshold; and
      program the NIC for protocol-agnostic segmentation of the payload based on the size of the payload exceeding the maximum size threshold and based on the segmentation profile, wherein the segmentation profile are to indicate rules for protocol-agnostic segmentation of the payload, the rules to include a segment size and an offset.

2. The NIC of claim 1, wherein the circuitry is further to:
   replicate header information for each segmented payload based on a description of replicated headers included in the segmentation profile; and
   generate a plurality of network packets, wherein each of the plurality of network packets includes replicated header information and a segmented payload.

3. The NIC of claim 1, further comprises the rules to include an encoding.

4. A method comprising:
   sending segmentation capabilities of a network interface controller (NIC) to a protocol stack of a compute device;
   receiving, from the protocol stack, a segmentation profile for a network packet based on the sent segmentation capabilities;
   determining whether a size of a payload of the network packet exceeds a maximum size threshold; and
   programming the NIC for protocol-agnostic segmentation of the payload based on the size of the payload exceeding the maximum size threshold and based on the segmentation profile, wherein the segmentation profile are to indicate rules for protocol-agnostic segmentation of the payload, the rules to include a segment size and an offset.

5. The method of claim 4, further comprising:
replicating header information for each segmented payload based on a description of replicated headers included in the segmentation profile; and
generating a plurality of network packets, wherein each of the plurality of network packets includes replicated header information and a segmented payload.

6. The method of claim 4, comprising the method implemented by a driver of the NIC.

7. The method of claim 4, comprising the method implemented by circuitry included in the NIC.

8. The method of claim 4, wherein the rules also include an encoding.

9. One or more non-transitory, machine-readable storage media comprising a plurality of instructions stored thereon that, when executed, cause a system to:
send segmentation capabilities of a network interface controller (NIC) to a protocol stack of a compute device;
receive, from the protocol stack, a segmentation profile for a network packet based on the sent segmentation capabilities;
determine whether a size of a payload of the network packet exceeds a maximum size threshold; and
program the NIC for protocol-agnostic segmentation of the payload based on the size of the payload exceeding the maximum size threshold and based on the segmentation profile, wherein the segmentation profile are to indicate rules for protocol-agnostic segmentation of the payload, the rules to include a segment size and an offset.

10. The one or more non-transitory, machine-readable storage media of claim 9, wherein the plurality of instructions, when executed, further cause the system to:
replicate header information for each segmented payload based on a description of replicated headers included in the segmentation profile; and
generate a plurality of network packets, wherein each of the plurality of network packets includes replicated header information and a segmented payload.

11. The one or more non-transitory, machine-readable storage media of claim 9, wherein the system comprises a driver of the NIC.

12. The one or more non-transitory, machine-readable storage media of claim 9, wherein the system comprises circuitry included in the NIC.

13. The one or more non-transitory, machine-readable storage media of claim 9, the indicated rules to include an encoding.

* * * * *